US007663687B2

(12) United States Patent
Neufeld

(10) Patent No.: US 7,663,687 B2
(45) Date of Patent: Feb. 16, 2010

(54) VARIABLE SPEED, VARIABLE RESOLUTION DIGITAL CINEMA CAMERA SYSTEM

(76) Inventor: Glenn Neufeld, 10684 Cranks Rd., Culver City, CA (US) 90230

( * ) Notice: Subject to any disclaimer, the term of this patent is extended or adjusted under 35 U.S.C. 154(b) by 641 days.

(21) Appl. No.: 11/178,093

(22) Filed: Jul. 7, 2005

(65) Prior Publication Data

US 2006/0007344 A1    Jan. 12, 2006

Related U.S. Application Data

(60) Provisional application No. 60/587,284, filed on Jul. 12, 2004.

(51) Int. Cl.
*H04N 9/07* (2006.01)
*H04N 5/33* (2006.01)
*H04N 7/18* (2006.01)

(52) U.S. Cl. .................. 348/337; 348/146; 348/167; 348/168

(58) Field of Classification Search .................. 348/36, 348/37, 335, 231.99, 47, 48, 95, 153; 460/56
See application file for complete search history.

(56) References Cited

U.S. PATENT DOCUMENTS

| | | | |
|---|---|---|---|
| 3,449,758 A | 6/1969 | Lavine | |
| 3,626,091 A | 12/1971 | Casper | |
| 3,804,976 A | 4/1974 | Gard | |
| 3,845,298 A | 10/1974 | Runciman | |
| 3,875,330 A | 4/1975 | Dahlqvist et al. | |
| 4,546,248 A | 10/1985 | Craig | |
| 4,589,030 A | 5/1986 | Kley | |
| 4,982,092 A | 1/1991 | Jehle | |
| 5,025,319 A | 6/1991 | Mutoh et al. | |
| 5,387,926 A | 2/1995 | Bellan | |
| 5,587,583 A | 12/1996 | Chin et al. | |
| 5,614,714 A | 3/1997 | Shaffer | |

(Continued)

FOREIGN PATENT DOCUMENTS

JP    2003-153063    *    5/2003

(Continued)

OTHER PUBLICATIONS

Bretthauer et al., "An Electronic Crantz-Schardin Camera," Review of Scientific Instruments, Feb. 1991, pp. 364-368, New York, Apr. 20, 2006.

(Continued)

*Primary Examiner*—Tuan Ho
*Assistant Examiner*—Selam T Gebriel
(74) *Attorney, Agent, or Firm*—Christie, Parker & Hale, LLP

(57) ABSTRACT

A digital cinema camera includes a plurality of imagers and a plurality of shutters mounted radially on a frame. A beam splitter disposed at a center of the frame rotates to provide an input optical beam sequentially to the plurality of imagers. When the input optical beam is aligned with a particular one of the imagers, a corresponding one of the shutters is triggered to apply the optical beam on the particular one of the imagers. The electrical signals generated by the imagers are first stored in RAM, and then transferred to a hard disk drive disposed in a removable magazine. This way, the magazine can be replaced with a new magazine, and the latent image data can be downloaded out of the removed magazine for post-processing while new image data is being stored in the new magazine.

6 Claims, 17 Drawing Sheets

U.S. PATENT DOCUMENTS

| | | |
|---|---|---|
| 5,721,585 A | 2/1998 | Keast et al. |
| 6,157,409 A | 12/2000 | Riches |
| 6,433,821 B1 | 8/2002 | Gouhara et al. |
| 6,463,215 B1 | 10/2002 | O'Connolly et al. |
| 7,224,384 B1 * | 5/2007 | Iddan et al. ............ 348/207.99 |
| 2002/0158981 A1 | 10/2002 | Glenn |
| 2003/0223007 A1 * | 12/2003 | Takane ....................... 348/335 |
| 2004/0056948 A1 * | 3/2004 | Gibson ........................ 348/56 |

OTHER PUBLICATIONS

Powell; United States Statutory Invention Registration, Registration No. H1740; published on Jul. 7, 1998, Apr. 20, 2006.

* cited by examiner

VARIABLE SPEED, VARIABLE RESOLUTION DIGITAL CINEMA CAMERA SYSTEM

CROSS-REFERENCE TO RELATED APPLICATION(S)

This application claims priority to and the benefit of U.S. Provisional Application Ser. No. 60/587,284, filed Jul. 12, 2004, the entire content of which is incorporated herein by reference.

FIELD OF THE INVENTION

The present invention is related to a cinema camera system, and more particularly to a digital cinema camera system that is capable of recording images at variable speed and resolution.

BACKGROUND

There has been a lot of interest in using digital cameras for cinematography. One problem with the digital cameras is that there is a minimum readout time associated with an imager (e.g., CCD). Hence, there is a limit to how fast a digital camera can record a sequence of images at higher resolutions and/or color depths. Therefore, there is a need for a digital cinema camera that can be used for making movies at a higher resolution and/or color depths than current hardware can support. By way of example, for slow motion video, from 48 frames per second (fps) to about 500 fps can be filmed easily using conventional film emulsion. Current technology imagers generally cannot support such high speed "filming" at the desired resolution. Further, an advanced digital cinema camera should also support recording images at variable speed and/or resolution.

Another factor that should be considered when using digital cameras for movie making is the amount of memory required to store image data, and the time it takes to read the image data from the memory for storage or for downsizing them to view as a lower resolution image. If the amount of data storage is limited to the memory available on the digital camera, the duration of high speed recording of images would be very short.

Therefore, it is desirable to provide a digital cinema camera system that can support recording images at variable speed, high resolution and high color depth, while simultaneously downsizing and storing the image stream for viewing at a lower resolution.

SUMMARY

In an exemplary embodiment of the present invention, a digital camera includes a plurality of imagers and a plurality of shutters mounted radially on a frame. A beam splitter disposed at a center of the frame rotates to provide an input optical beam sequentially to the plurality of imagers. When the input optical beam is aligned with a particular one of the imagers, a corresponding one of the shutters is triggered to apply the optical beam on the particular one of the imagers. The image streams generated by the imagers are first stored in RAM as image data, and then transferred to a hard disk drive disposed in a removable magazine. This way, the magazine can be replaced with a new magazine, and the image data can remain in the removed magazine, while new image data is being stored in the new magazine. The RAM should be a very high speed RAM, for example. Further, the hard disk drive may include an array of hard disk drives. In addition, the frame may have a generally regular polygonal, circular, cylindrical or spherical shape.

In another exemplary embodiment of the present invention, a method of making a cinema is provided. The method includes rotating a beam splitter about a center optical axis of a digital camera having a plurality of imagers mounted radially on a frame, such that an optical beam from the beam splitter is provided sequentially to the imagers as the beam splitter rotates, to generate image data. The image data is then stored in RAM, and transferred into a hard disk disposed in a removable magazine. The image data from the imagers are interleaved and post processed to produce the cinema. For example, the images may be interleaved and post processed outside the camera to produce the cinema.

These and other aspects of the invention will be more readily comprehended in view of the discussion herein and accompanying drawings.

DETAILED DESCRIPTION

In exemplary embodiments of the present invention, a digital camera can record images at continuously varying resolution, color depth and speed using geometry/stepping nature of the camera design. This way, regular, relatively slow HiRez/HiColor CCDs of the current technology can be used to make a digital camera that can capture images at normal speeds in a continuously variable way.

In exemplary embodiments of the present invention, a digital cinema camera includes a plurality of imagers ("sensors") for sequentially taking images of an object and/or scenery. By way of example, the digital cinema camera includes N imagers, wherein N is greater than 1. This way, the camera can support a shooting speed of up to N times the speed the digital camera having a single imager with similar resolution and readout speed can support. The number of imagers "N" can vary depending on the application. In general N imagers that are (360/N) degrees apart can be used. By way of example, eight 45 degree apart imagers or twelve 30 degree apart imagers may be used.

The imagers are mounted on a generally regular polygonal, circular, cylindrical or spherical frame that is substantially fixed with respect to the object/scenery being captured by the digital cinema camera. By way of example, the frame may have an octagonal shape when eight imagers are used. Further, the frame may have a shape of a regular polygon having 12 sides when twelve imagers are used.

The camera has a beam splitter or mirror that is mounted on the optical path of the incoming optical beam representing the images. The beam splitter directs a portion of the input optical beam to one of the imagers depending on the orientation of the beam splitter. Because the image reflected by the beam splitter is rotated depending on the orientation of the beam splitter, the imagers themselves are rotated so as to maintain upright images when the images from all of the imagers are interleaved to form a continuous sequence of images.

The portion of the optical beam that passes through the beam splitter is received at an eyepiece for viewing by a user (e.g., camera man) who operates the digital cinema camera. Since the beam splitter splits the energy of the optical beam, dark scenes may look even darker when only a portion of the optical beam is received by the imagers. Therefore, in one exemplary embodiment, the digital cinema camera may also include a mirror for reflecting substantially the entire energy of the optical beam sequentially to the imagers. Hence, the mirror can be used instead of or in addition to the beam splitter in one exemplary embodiment.

Figure 1:
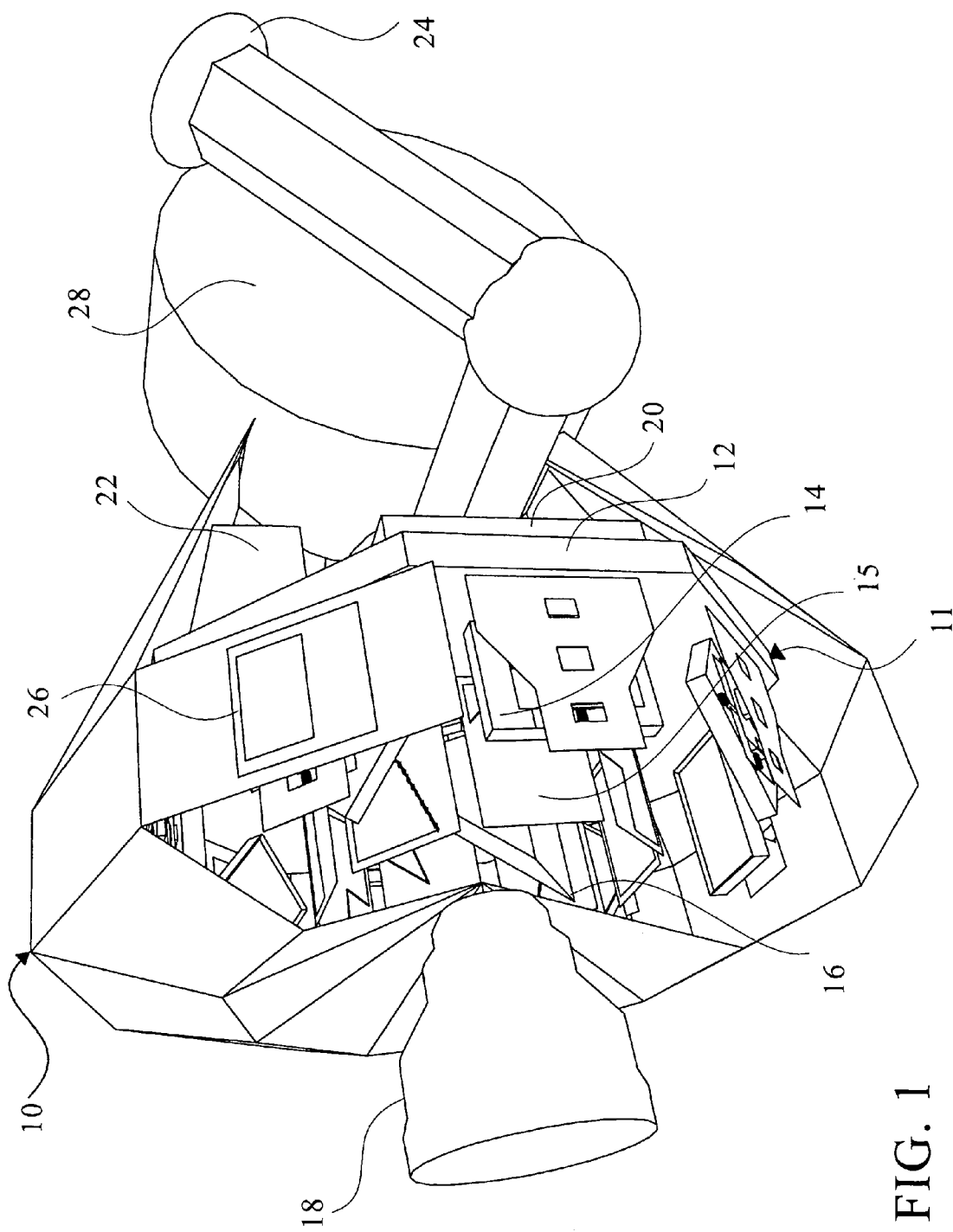
FIG. 1 is a simplified cut-away view of a digital cinema camera in one exemplary embodiment of the present invention.

As FIG. 1 illustrates a simplified depiction of a digital camera 10 ("digital cinema camera"), there may be other components that are not shown in FIG. 1. For instance, circuitry and storage medium used for converting image format to a format for "real-time" viewing is not specifically identified, and instead incorporated in FIG. 1 into a controller 22. Further, while it is not shown in FIG. 1, there may be a partitioning wall disposed between each pair of adjacent imagers so as to limit illumination of an imager when a corresponding shutter is not triggered.

The digital camera 10 includes an imager assembly 11, which includes a plurality of imagers 14, a plurality of shutters 15 and a beam splitter 16 mounted on a substantially regular polygonal frame 12. As shown, there are eight imagers 14 mounted on the frame 12. In other embodiments, there could be more (e.g., 12) or less (e.g., 6) imagers mounted on the frame. In fact, while 8 imagers are illustrated and described in reference to FIG. 1 for convenience of description, it is to be understood that the description applies equally as well to a digital camera having N imagers that are located (360/N) degrees apart from one another, where N is any integer greater than 1.

The number of shutters 15 are identical to the number of imagers, as each shutter 15 operates with a corresponding one of the imagers 14. The shutter may be electronic and/or a physical type. Since the eight imagers 14 are substantially equally spaced in the digital camera 10 of FIG. 1, each imager (or the center thereof) is located 45 degrees away from two adjacent imagers. A camera lens 18 is used to receive images into the digital camera 10.

The imagers 14 can be of any high resolution that their imaging area can support. By way of example, higher resolutions are dependent only on the resolutions of available imagers. Each image 14, for example, may have standard 35 mm film dimensions (i.e., 2.4 cm by 1.75 cm) or any other suitable dimensions. Further, the imagers 14 can take, at variable speed and color depth, images corresponding to 35 mm film, 70 mm film and/or any conventional film sizes that are used in the motion picture industry now or to be used in the future.

Each imager 14 includes readout electronics for reading image data captured by the imager and providing the image data to a memory 20. Since an imager (e.g., CCD) has an associated minimum readout time, having a very high resolution imager will limit the speed at which the images can be captured. In other words, there is a trade off between speed and resolution of the digital camera. There is a direct relationship between the maximum frame rate at which the camera can record images and the resolution and color depth at which the images are recorded. Faster imagers might allow a camera constructed with, for example, 8 imagers, to capture at a frame rate of up to 320 fps, whereas slower, higher resolution imagers might limit the camera's upper frame rate to 160 fps. In general, the maximum frame rate at which the camera could operate is inversely proportional to the resolution and the color depth delivered by the imagers used to construct the camera. Hence, the size of the frames being recorded is not restricted by the camera, but by the desired frame rate. Of course, higher frame rates can always be achieved by increasing "N", the number of imagers in the camera.

The memory 20 has a FIFO structure for receiving the image data and for providing the received image data to a removable magazine 28. The memory 20 may include a plurality of memories, each corresponding to one of the imagers. The memory 20 should have a triple port to perform the following functions: 1) receive image data from the imagers; 2) continuously provide the image data to the removable magazine 28; and 3) provide the image data to an image downsizer for converting an image to a standard video or digital format (e.g., NTSC or DV-AVI) for outputting to an external monitor or for display on an integrated video display panel (e.g., a display panel 26). Without using such memory having a FIFO structure and continuous storage in the hard disks, it may perhaps be possible to capture images at a high speed for a very short duration (e.g., a single rotation of the beam splitter 16), but not for a duration desired for a cinema camera.

By way of example, in an exemplary embodiment of the present invention where 8 imagers are used, the camera may be able to store the images for 8 minutes using 2K/24 bpp imagers shooting at 24 fps. Further, the images can be stored for 4 minutes at 48 fps, for 2 minutes at 96 fps, for 1 minute at 192 fps, for 30 seconds at 384 fps, and so forth. Of course, making a camera with 12 imagers/storage banks would extend the time before the disks were overrun by the RAM output, perhaps 12 minutes at 24 fps, and so forth. This way, a digital camera having normal variability similar to a conventional film camera can be realized for recording images for periods longer than can be achieved by a single comparable imager.

The magazine 28 includes a plurality of disk drives for more permanent storage of the image data from the memory 20. The magazine 28 is removable such that a new magazine may be installed for storing additional images. An eyepiece 24 is used to view the images through the beam splitter 16. When the beam splitter 16 is replaced by a mirror (e.g., to increase image brightness when taking images of a dark scene), the eyepiece cannot be used for viewing the scene directly. Instead, the display panel 26, another integrated display panel (not shown) and/or an external display device may be used to view the images. The display panel 26, by way of example, may be a TFT LCD panel or any other suitable display panel. The display panel 26 may ordinarily be used, for example, as a camera control panel having input devices mounted/displayed thereon for a user to control the digital camera. The display panel 26 may also display the status of the camera such as the running status of the camera and voltage level.

The controller 22 functions as a camera controller and image processor. The controller 22 in practice may include one or more ASICs, processors and/or other logic circuitry, and may not necessarily be a single integrated system. By way of example, the controller 22 may have one or more of, without being limited to, the following functions: 1) image storage control; 2) camera power control; 3) camera lens control; 4) camera interlock control; 5) camera alignment control; 6) analysis of input images; 7) image processing (e.g., downsizing, format conversion, interleaving, etc.); and 8) playback of processed images.

Figure 2:
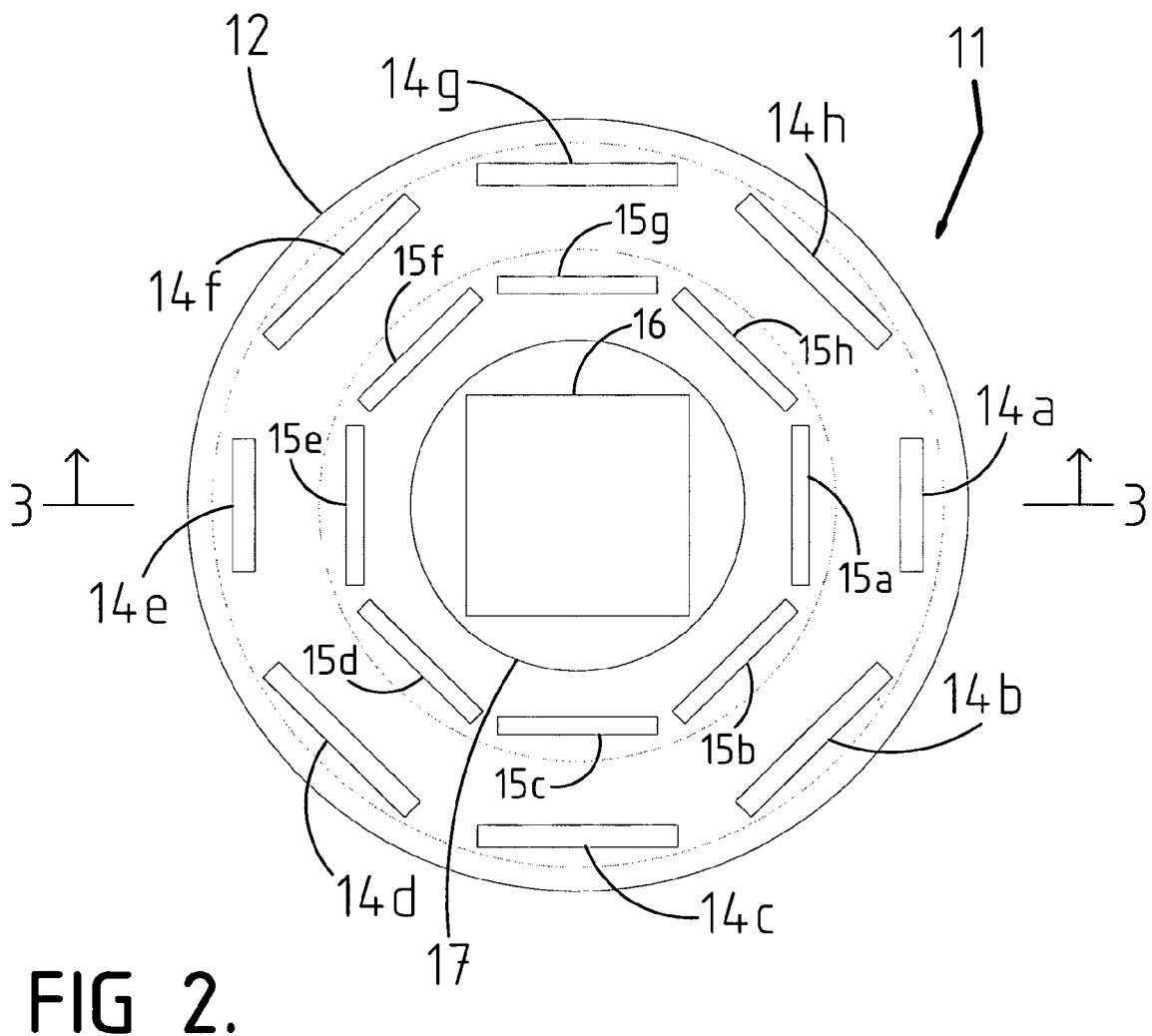
FIG. 2 is a simplified front view of imagers and shutters mounted radially on a frame, as seen from the front of the camera of FIG. 1.

As can be seen in FIG. 2, the camera includes an imager assembly 11 having a plurality of imagers 14a-14h and corresponding shutters 15a-15h mounted on a frame 12. The frame 12 appears circular in FIG. 2, but in practice, may have a regular polygonal (e.g., octagonal to correspond to eight sensors) shape. The imagers and the shutters are arranged in a generally regular polygonal configuration, with each imager/shutter being substantially equidistant from and substantially 45 degrees apart from two adjacent imagers/shutters. The frame 12 (and the shutters and the imagers) is substantially fixed with respect to the camera body. By way of example, for an embodiment having N imagers, each imager would be mounted on a frame at (360/N) degrees apart from two adjacent imagers. Further, for N-imager camera running at M-revs-per-second, the apparent frame rate is N×M fps.

The beam splitter 16 is mounted at approximately the center of the frame 12, and substantially equidistant from the shutters and the imagers. The beam splitter 16 is mounted on a rotating stage 17 having a hollow center such that an optical beam coming in through the camera lens can travel through the camera substantially unobstructed except by the beam splitter 16.

Figure 3:
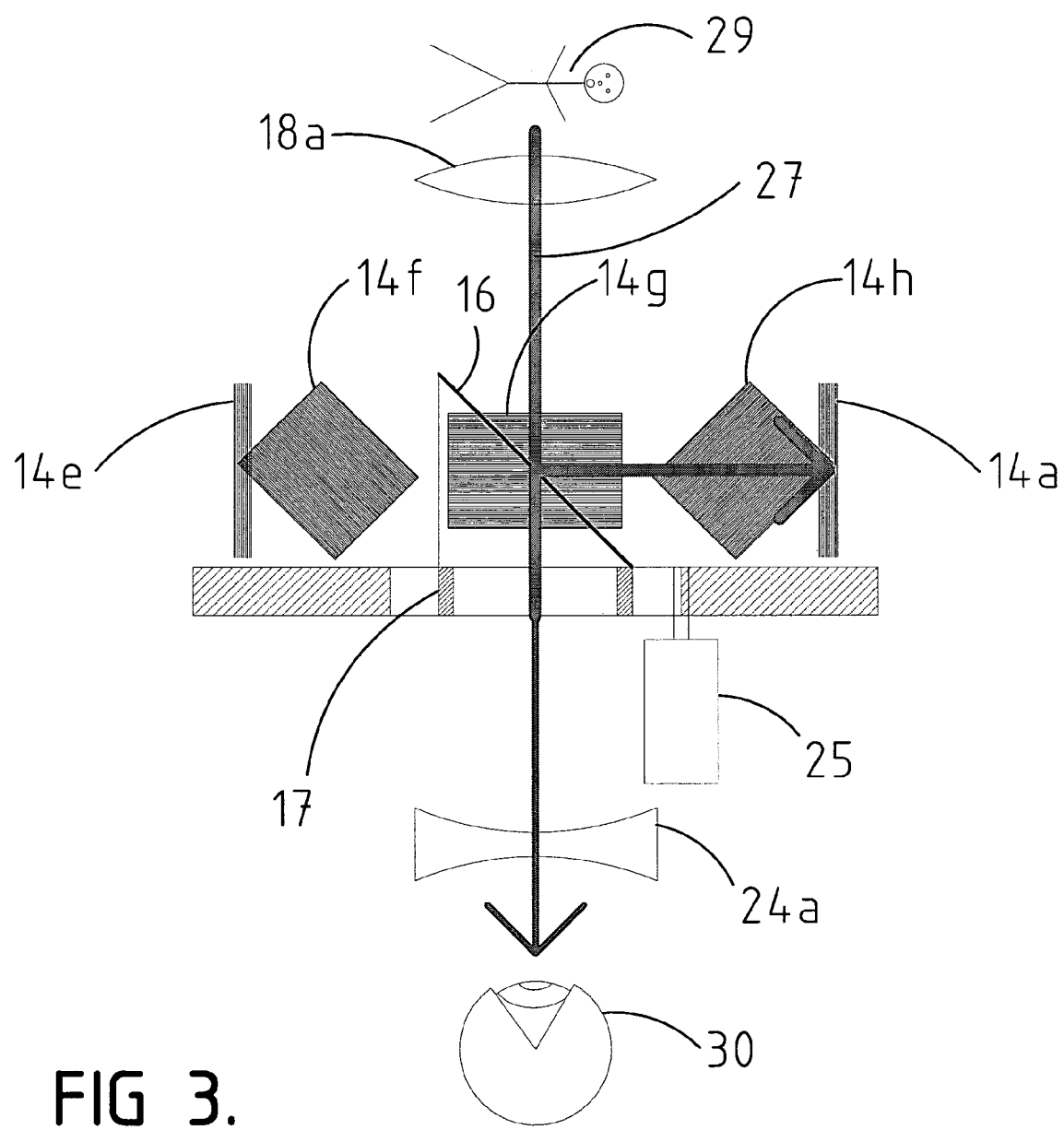
FIG. 3 is a simplified side view of the camera as seen in the direction 3-3 of FIG. 2.

Referring now to FIG. 3, the rotating stage 17 is coupled to a drive motor 25 that can rotate the rotating stage 17, and therefore the beam splitter 16, about a center optical axis 27 of the digital camera. By varying the speed of the drive motor 25, the frame rate of the digital camera can be adjusted. By way of example, for an eight imager camera, the rotating stage (and the beam splitter 16) may rotate 3 times a second to generate a 24 fps image sequence, may rotate 1 time a second to generate an 8 fps image sequence, or may rotate 20 times a second to generate a 160 fps image sequence. The rotating stage 17 may rotate at a slower rate or at a faster rate to generate an image sequence having different frame rates. For instance, the rotating stage 17 may turn at a speed to provide a frame rate around normal movie speeds. For example, the normal movie speeds may range from 18 fps for super 8 mm negative to 60 fps for ShowScan® 70 mm negative.

A camera lens 18a and an eyepiece 24a are simplified depiction of the camera lens 18 and the eyepiece 24, respectively, of FIG. 1. Through the camera lens 18a, the beam splitter 16 and the eyepiece 24a, an observer 30 (e.g., camera man) views an object 29 ("a person"). At the same time, in the exemplary embodiment of FIG. 3, the beam splitter 16 splits the incoming optical beam, and redirects one split portion at a substantially right angle to one of the imagers 14a-14h. In the illustrated embodiment of FIG. 3, the split portion of the optical beam is reflected in the direction away from the sloped face of the beam splitter 16.

Figure 4A:
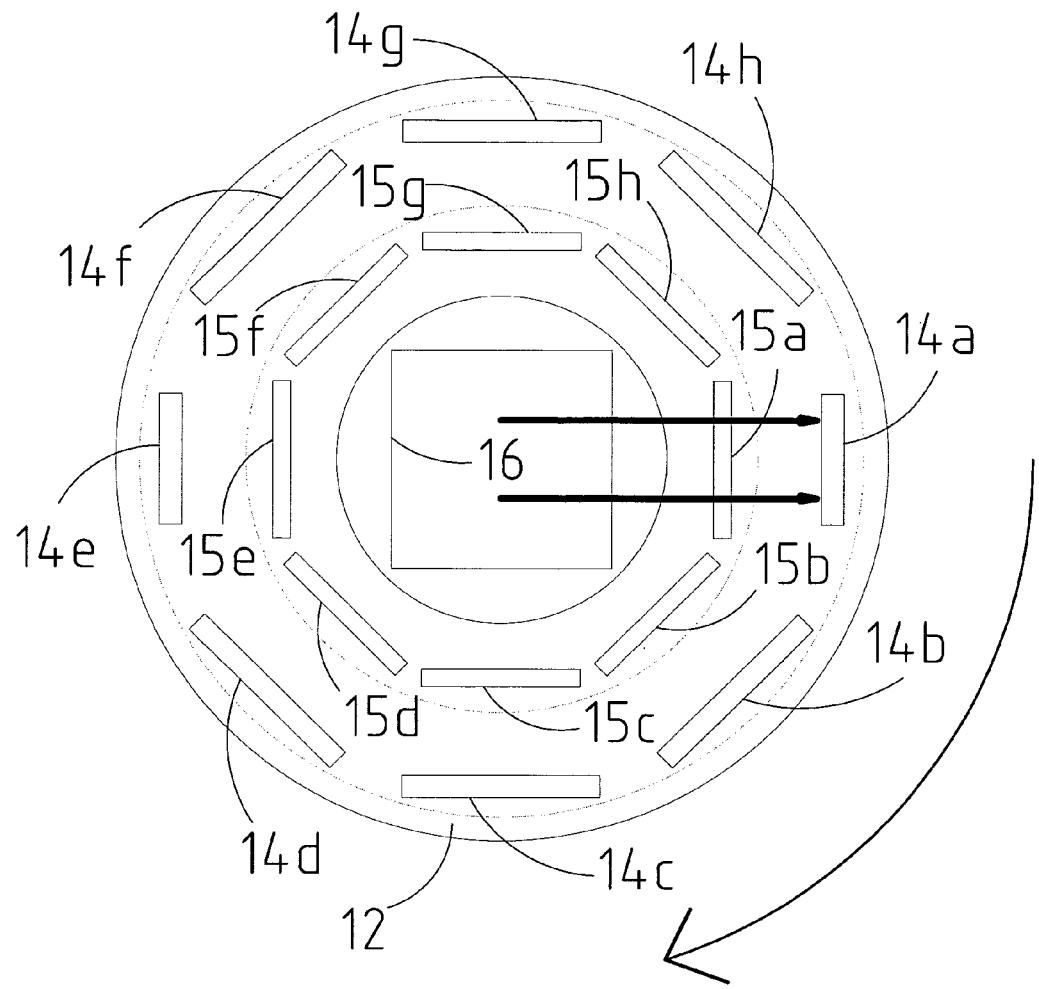
FIGS. 4A-4H illustrate the rotation of the beam splitter, and the corresponding operation of the shutters.
Figure 4B:
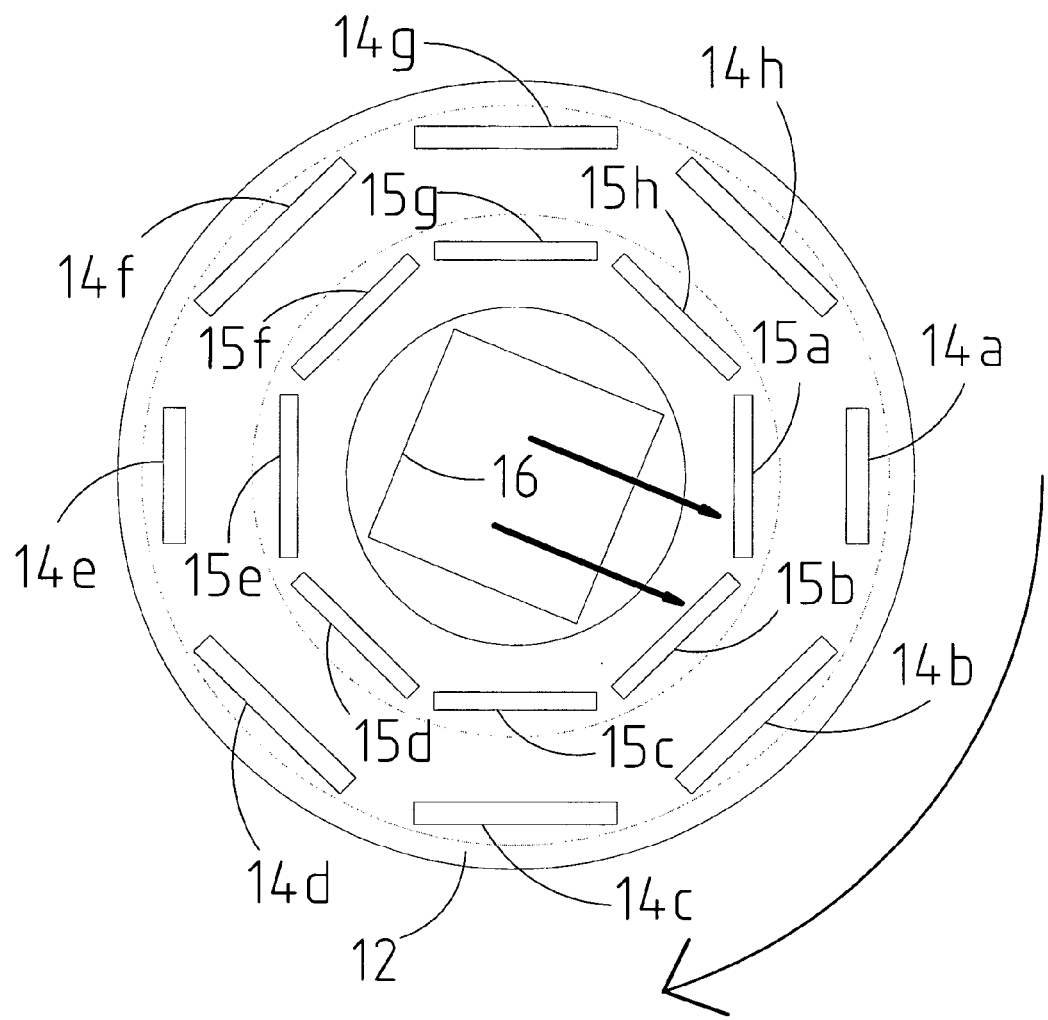

The beam splitter 16 in FIGS. 4A-4H is illustrated as rotating in a clockwise direction. The beam splitter 16 may rotate in a counter-clockwise direction in other exemplary embodiments. It is shown in FIG. 4A that as the incoming image crosses the first imager 14a, the first shutter 15a is triggered for the first imager 14a to take the image. In FIG. 4B, it is shown that as the beam splitter continues to turn, when the optical beam is applied between the first imager 14a and the second imager 14b, none of the shutters is triggered, and therefore no image is taken.

Figure 4C:
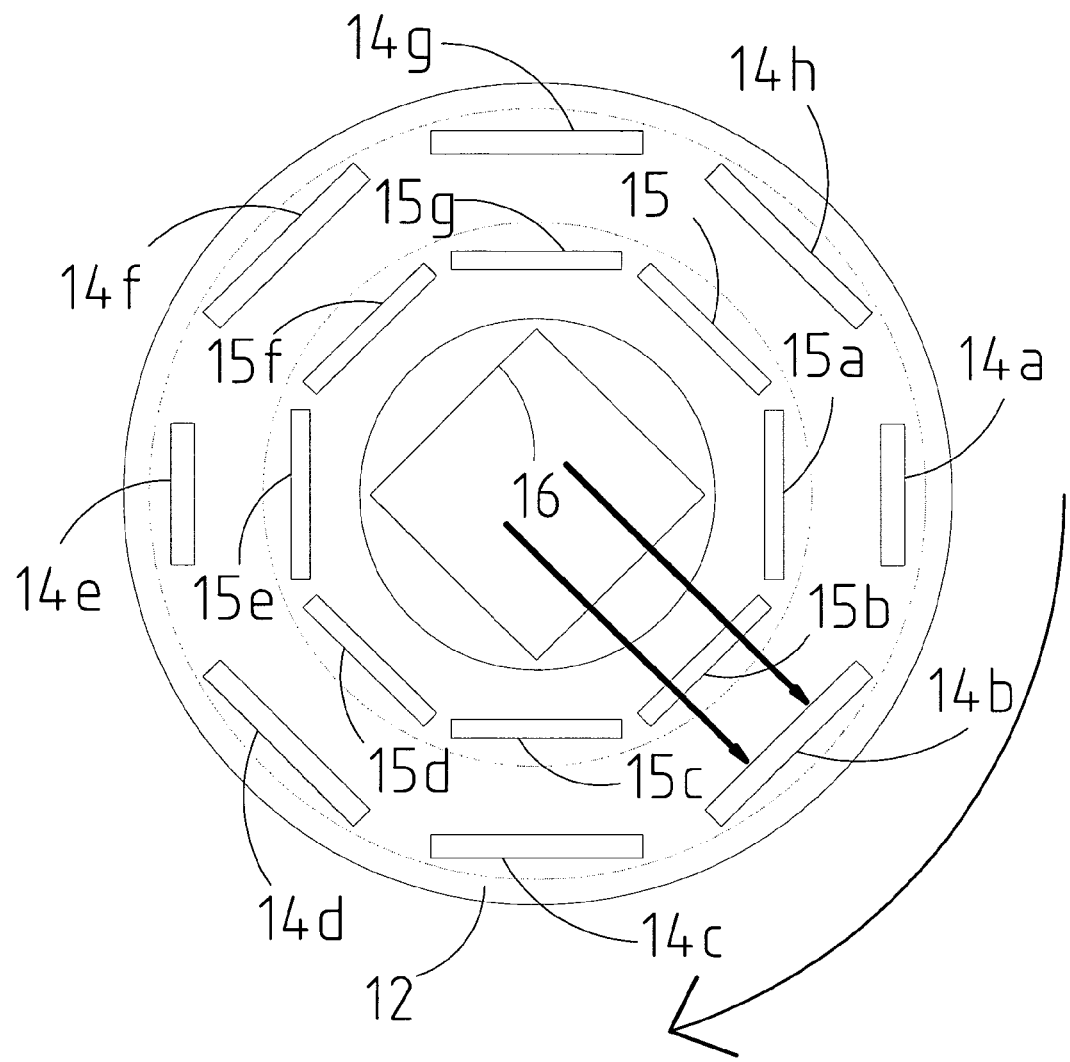
Figure 4D:
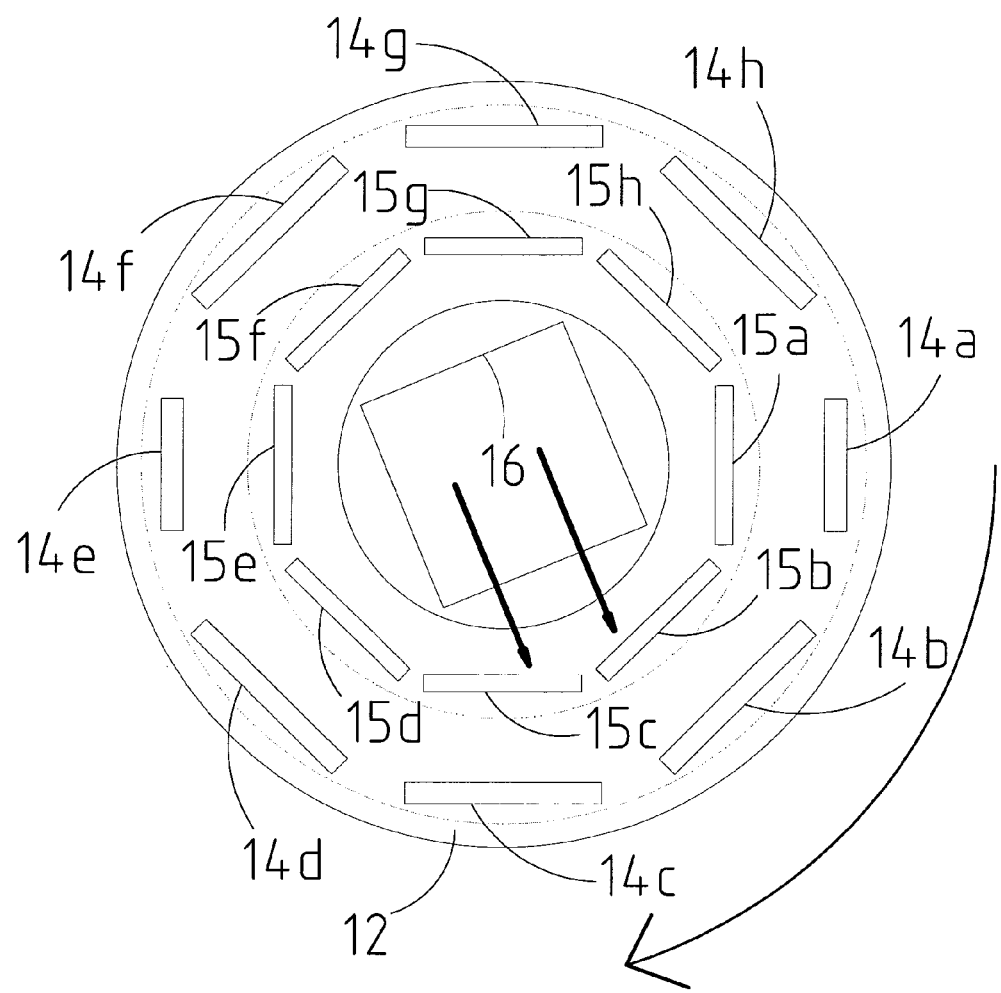
Figure 4E:
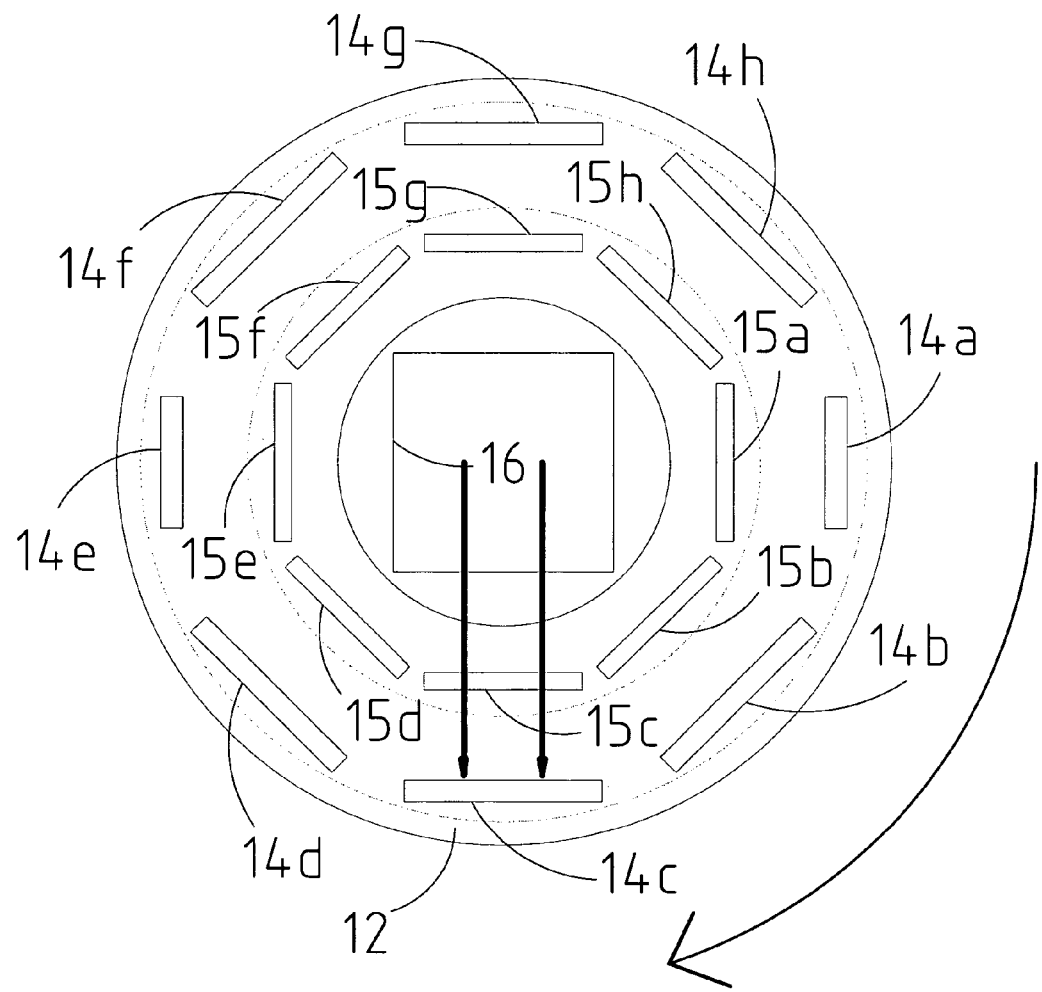
Figure 4F:
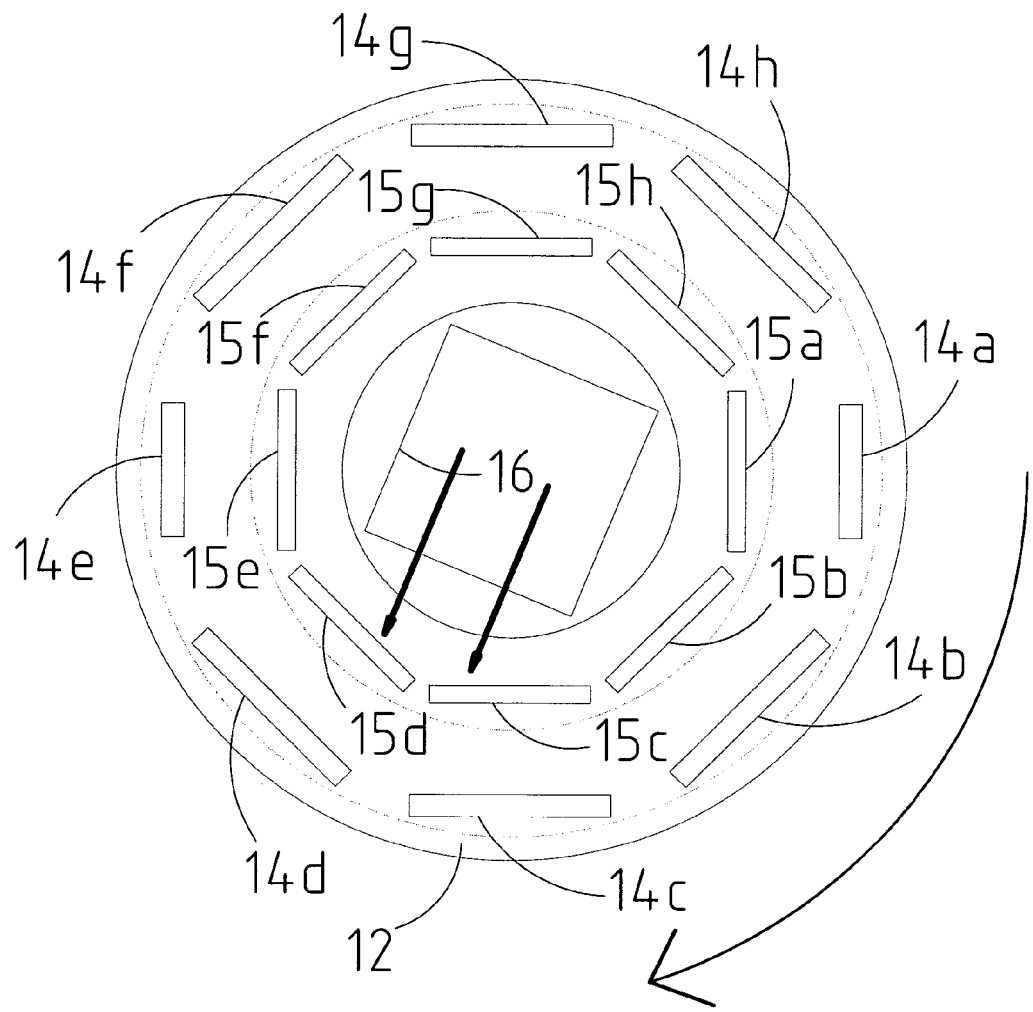
Figure 4G:
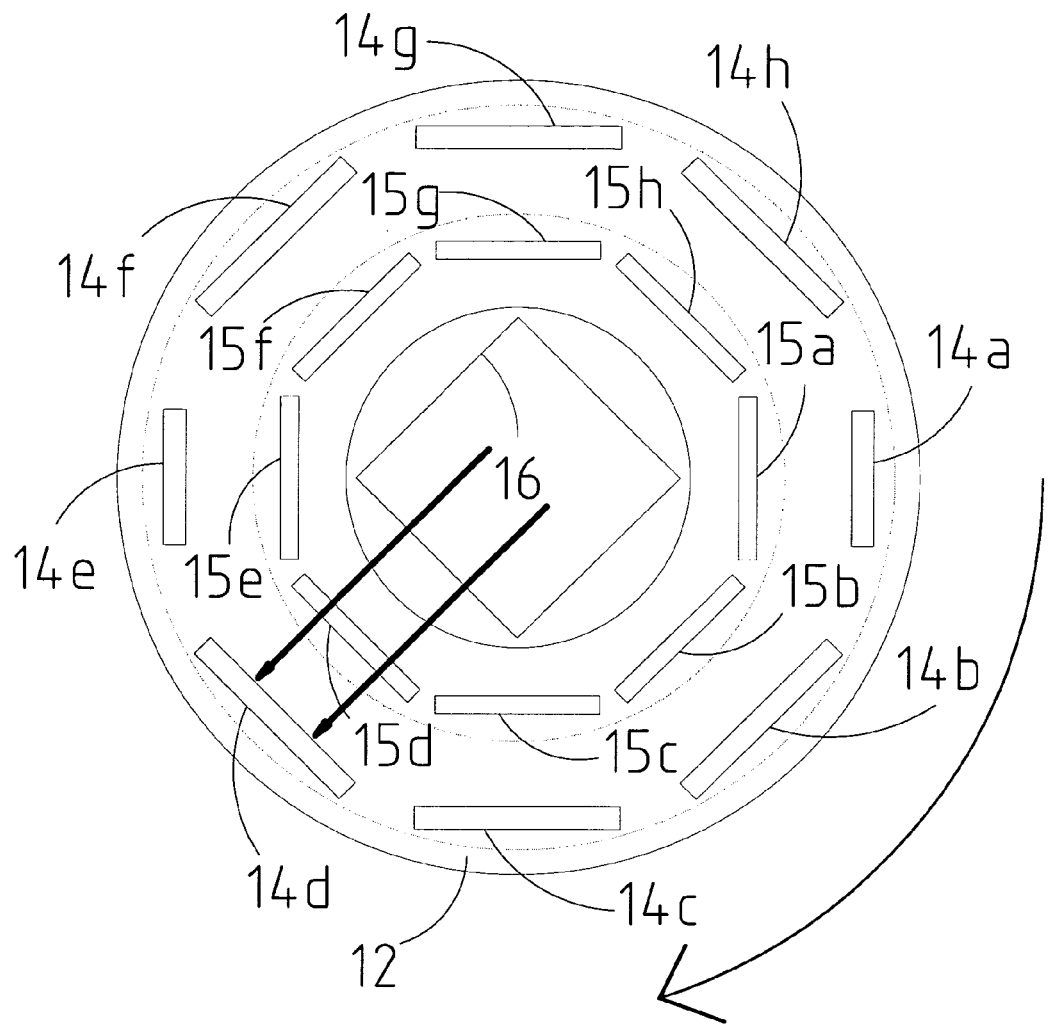
Figure 4H:
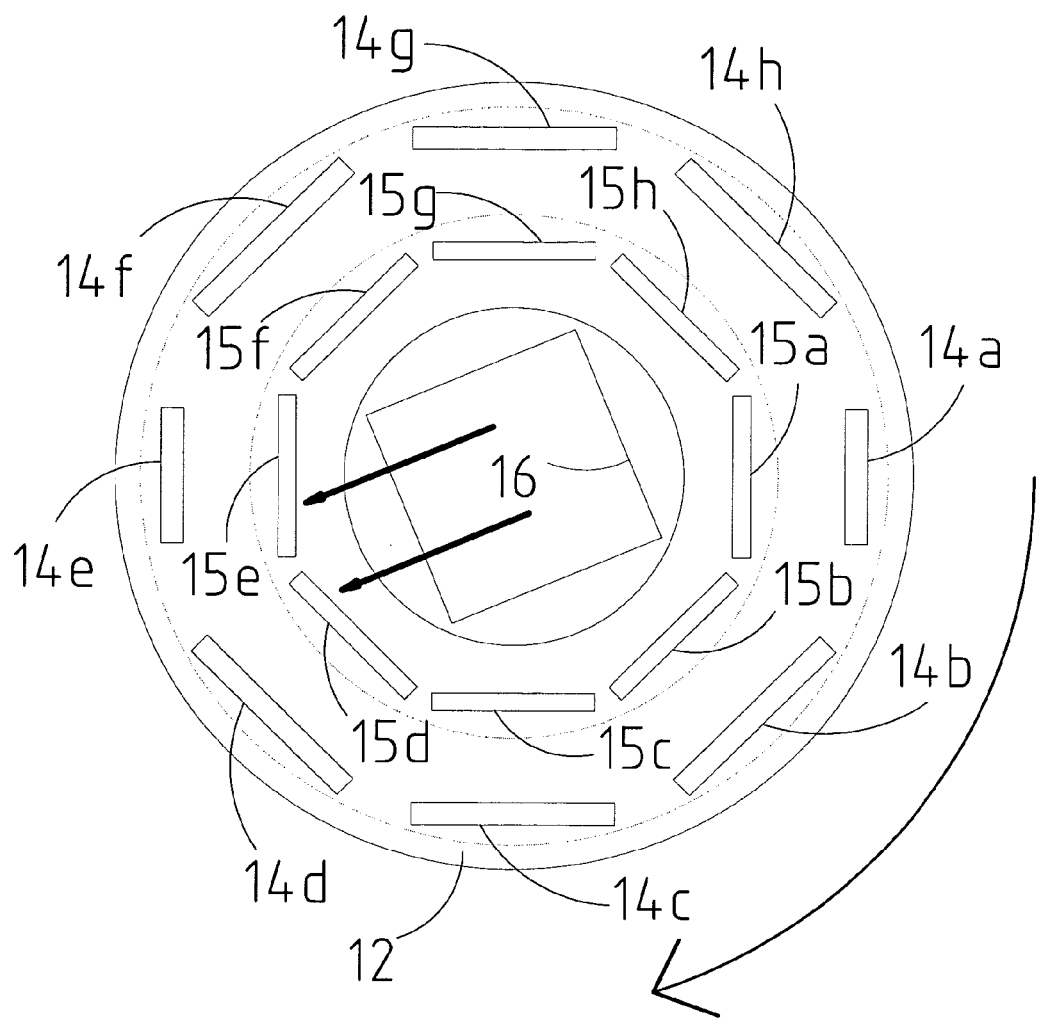

In FIG. 4C, as the optical beam is aligned with the second imager 14b, the second shutter 15b is triggered for the second imager 14b to take the image. Then, in FIG. 4D, none of the shutters is triggered when the optical beam is applied between the second imager 14b and the third imager 14c. This continues in FIG. 4E where the optical beam is aligned with the third imager 14c and the third shutter 15c has been triggered; in FIG. 4F where the optical beam is applied between the third imager 14c and the fourth imager 14d and none of the shutters has been triggered; in FIG. 4G where the optical beam is aligned with the fourth imager 14d and the fourth shutter 15d has been triggered; and in FIG. 4H where the optical beam is applied between the fourth imager 14d and the fifth imager 14e and none of the shutters has been triggered. The image of the optical beam will be similarly captured by the fifth imager 14e, the sixth imager 14f, the seventh imager 14g and the eighth imager 14h, with no image being taken of the optical beam when it is applied between two adjacent imagers. Of course, for a camera having N imagers, the images would be captured first by the first imager, then by the second imager, and so forth, until being captured by (N−2)th imager, (N−1)th imager and then finally by the Nth imager.

Because of the rotation of the beam splitter 16, the image split by the beam splitter 16 would appear to be rotated corresponding to the angle of rotation of the beam splitter 16. Therefore, each imager should be rotated by an amount corresponding to its position on the frame such that the rotated image when projected upon the rotated imager would create an upright image at each imager. This way, an upright sequence of images may be generated by interleaving the images from the imagers in exposure order.

Figure 5:
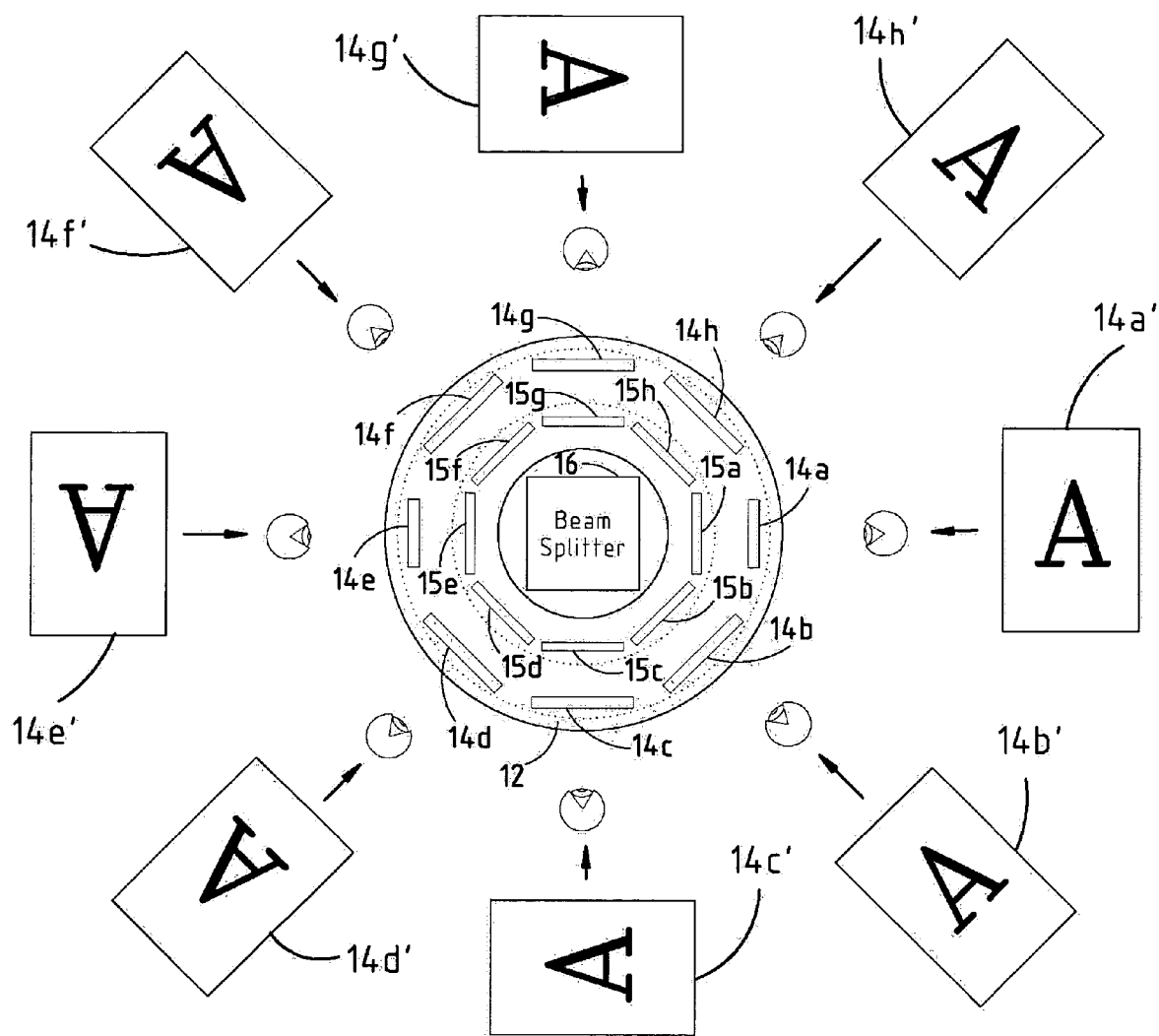
FIG. 5 illustrates imager orientation angles based on their radial angle positioning within the camera body.

It can be seen in FIG. 5 that the first imager 14a is rotated by 90 degrees since the optical beam transmitted by the beam splitter 16 is rotated by 90 degrees when the optical beam is applied to the first imager 14a. Of course, in other embodiments, the digital camera may be designed such that the first imager 14a is in the upright position or in any position with respect to upright that facilitates proper design of the camera.

When the optical beam is applied to the second imager 14b, the beam splitter 16 is rotated from the position aligned with the first imager by 45 degrees. Therefore, the second imager 14b has been rotated (or tilted) by only 45 degrees to correspond to the rotated image, so as to capture the image as an upright image. Similarly, the third imager 14c is in an upright position (i.e., rotated 45 degrees from the orientation of the second imager 14b); the fourth imager 14d is rotated by −45 degrees; the fifth imager 14e is rotated by −90 degrees; the sixth imager 14f is rotated by −135 degrees; the seventh imager 14g is rotated by −180 degrees; and the eighth imager 14h is rotated by −225 degrees.

In FIG. 5, the rotation of the imagers 14a-14h are indicated by corresponding rotated boxes 14a'-14h'. The rotated boxes 14a'-14h' represent the rotated imagers as viewed from a side of the rotating table 12 in a direction substantially aligned with the image plane of the corresponding imager. A letter "A" oriented in various different degrees of rotation is shown in each of the boxes 14a'-14h' to indicate the orientation of the corresponding imagers 14a-14h.

In general, when using a number of imagers N, each imager is placed around the frame at $\phi=360/N$ degrees from two adjacent images. This requires that the beam splitter 16 be rotated by $\phi=360/N$ degrees between two adjacent images. Because the beam splitter 16 is rotated by $\phi$ degrees, the image reflected by the beam splitter 16 is also rotated by $\phi$ degrees between two adjacent imagers. Therefore, each imager is rotated by ϕ degrees as compared to two adjacent imagers to present an upright image when the images are interleaved to form a sequence of images (i.e., cinema or movie).

Figure 6:
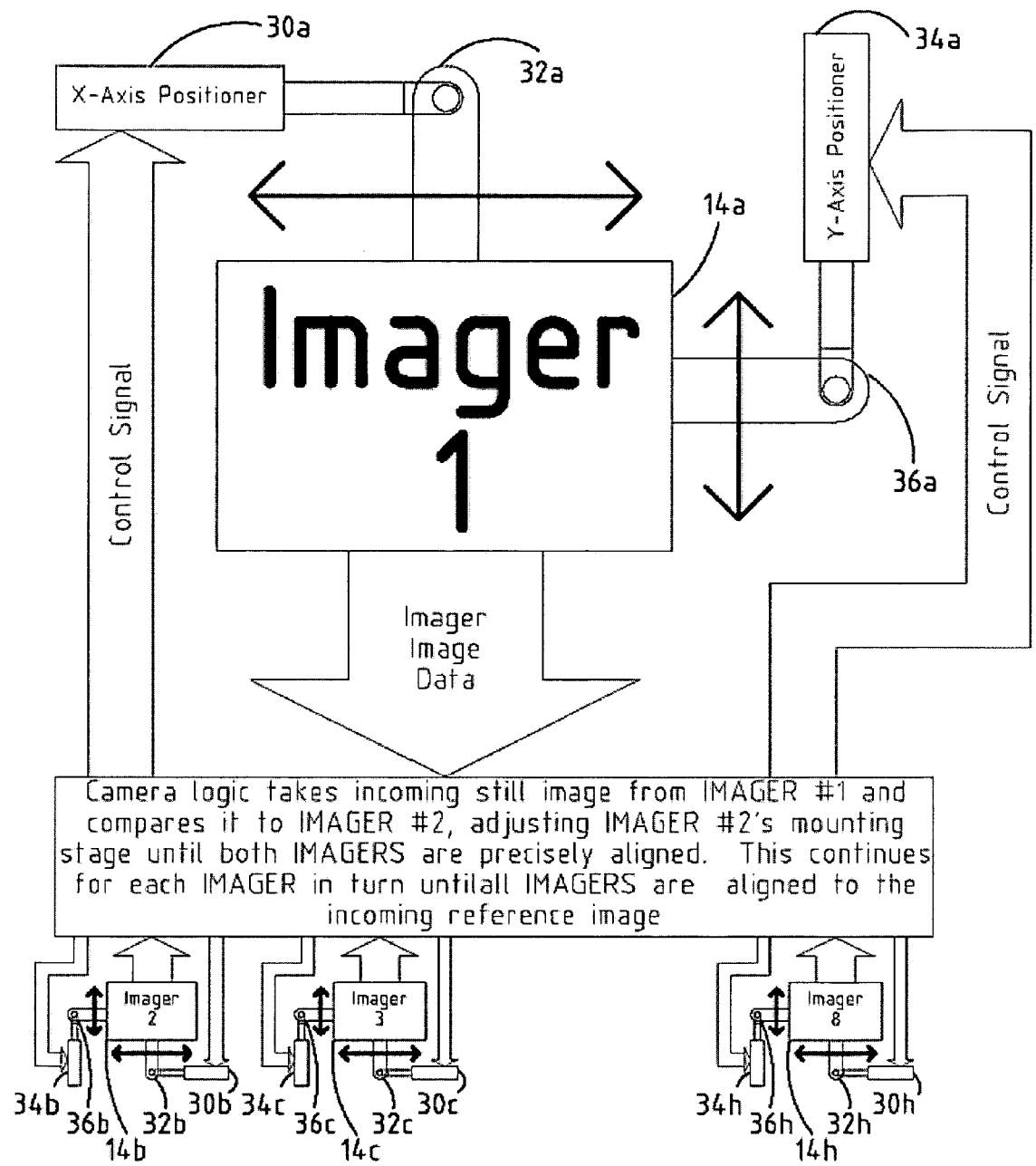
FIG. 6 illustrates a simplified imager adjustment system for aligning the imagers.

Since the imagers are capturing from a single input image beam, the imagers should be precisely aligned so that the resulting post-processed stream of imagers are in registration with each other. Therefore, as shown in FIG. 6, x and y position of each imager can be adjusted. The first imager 14a is attached to an x-axis positioner 30a via an x-adjustment mechanism 32a. Further, the first imager 14a is attached to a y-axis positioner 34a via a y-adjustment mechanism 36a.

Similarly, the second imager 14b is attached to an x-axis positioner 30b and a y-axis positioner 34b via an x-adjustment mechanism 32b and a y-adjustment mechanism 36b, respectively; the third imager 14c is attached to an x-axis positioner 30c and an y-axis positioner 34c via an x-adjustment mechanism 32c and a y-adjustment mechanism 36c, respectively; and the eighth imager 14h is attached to an x-axis positioner 30h and an y-axis positioner 34h via an x-adjustment mechanism 32h and a y-adjustment mechanism 36h, respectively.

Figure 7:
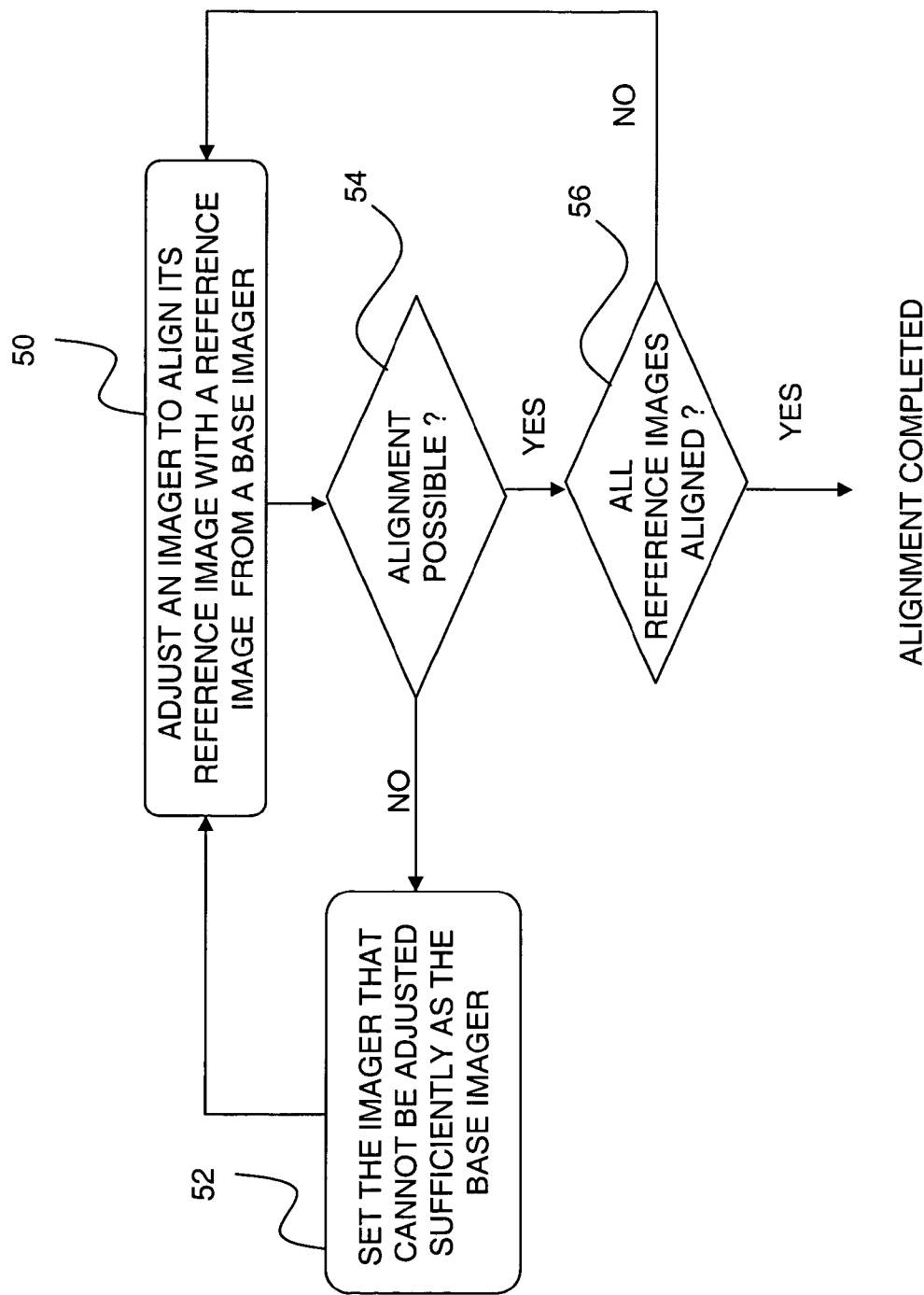
FIG. 7 illustrates a process of aligning imagers.

By way of example, the alignment of imagers can be achieved as illustrated in FIG. 7. Using the process of FIG. 7, the digital camera can align itself through an iterative process. During the comparison of the reference images described below, the centers of the reference images, for example, may be lined up to indicate alignment of the imagers. The alignment process, for example, should be performed at least once per day of shooting, and substantially whenever the camera is subjected to abnormal levels of shock and vibration.

First, an identical reference image is taken using two imagers (e.g., the first and second imagers). The camera logic takes the incoming reference images from the first imager and compares it to the incoming still image from the second imager. If the images differ, the second imager is adjusted to align its reference image with the reference image from the first imager ("the base imager") (50). In other words, the mounting stage of the second imager is adjusted until the first and second imagers are substantially precisely aligned to each other. The alignment of imagers to the base imager (e.g., the first imager) continues until all of the reference images have been aligned (56).

It is possible for one or more imagers to be mis-aligned such that it cannot be corrected beyond a certain limit, and a substantially precise alignment cannot be achieved with any amount of adjustment. If it is determined that alignment is not possible (54), the imager that cannot be adjusted sufficiently is selected as the base imager, and the imager adjustment process (50) is restarted with the unadjustable imager as the base imager. In other words, when one of the imagers cannot be adjusted sufficiently to align with all of the other imagers, the other imagers should be adjusted to accommodate such imager(s).

Figure 8:
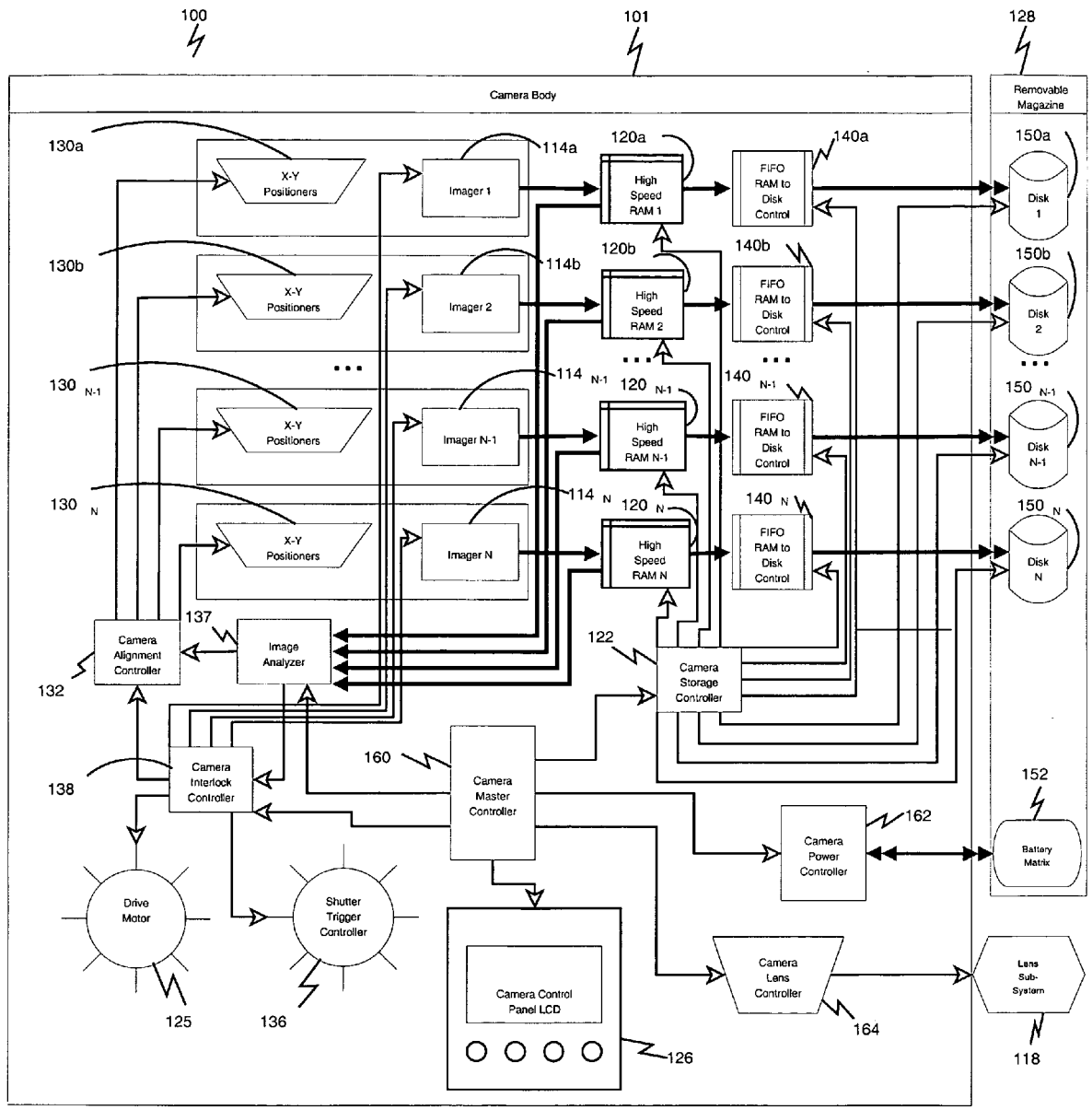
FIG. 8 is a block diagram illustrating the camera electronics, where N imagers are used.

In the digital camera 100 of FIG. 8, N imagers 114a, 114b ... $114_{N-1}$ and $114_N$ are used to take images continuously. The imagers are each coupled to one of the corresponding x-y positioners 130a, 130b ... $130_{N-1}$ and $130_N$ for adjustment in x-axis and y-axis directions. The x-y positioners are controlled by a camera alignment controller 132 for such alignment. The camera alignment controller 132 receives feedback from an image analyzer 137 which is used, among other things, to compare reference images from two imagers to determine adjustment requirements. To this end, the image analyzer 137 is controlled by a camera master controller 160.

A camera interlock controller 138 also provides a control signal to the camera alignment controller 132. The controller input includes the beam splitter position and velocity. The controller commands the beam splitter to point to an imager, which is the imager that the camera interlock controller 138 is currently positioning, reading, and image-comparing to images stored in RAM from the other imagers.

The camera interlock controller 138 also controls the imagers. Such controls include one or more of, but not limited to, preparing the imagers to acquire, holding acquisition until the beam splitter is aligned and/or stopped, triggering the acquisition, and directing the acquired image to be held in RAM (not sent to disk) for the imager analyzer to work on.

The camera interlock controller 138 is controlled by the camera master controller 160, and also receives an input from the imager analyzer 137 for making adjustment to the imagers. The interlock controller is advised of the next imager acquisition needed by the imager analyzer so it can signal success and trigger an alignment image to be acquired. The camera master controller tells the interlock controller that everything is in place for it to start keeping all subsystems advised of the beam splitter/shutter/storage timings and real-time positions.

The camera interlock controller also controls a driver motor 125 for turning the rotating stage on which the beam splitter is mounted. The camera interlock controller also sends control signals to a shutter trigger controller 136 such that the shutters are triggered synchronously to the positioning of the optical beam on the corresponding imagers. The image outputs from the imagers $114a$-$114_N$ are provided, respectively, to corresponding high speed RAMs 120a, 120b ... $120_{N-1}$ and $120_N$. Each RAM is configured as a FIFO such that the images taken and stored in the FIFO are read out as new images are being stored. By way of example, each RAM may be a triple-port RAM fabricated by stacking two dual-port RAMs one on top of the other.

A first one of the ports is used as an input port for receiving image data from one of the plurality of imagers $120a$-$120_N$. A second one of the ports is used for storing the image data in a corresponding one of N disks 150a, 150b ... $150_{N-1}$ and $150_N$. The N disks are installed in a removable magazine 128 such that the magazine can be removed when it is time to download and post-process the imagery. Then a new magazine can be used to take additional image sequences. Typically, the magazine is exchanged for a new "empty" (freshly downloaded) magazine so that shooting can continue without waiting for the download of the previous magazine to complete. The removable magazine 128 also contains a battery 152 for providing power to the disks $150a$-$150_N$. The battery 152 interfaces with a camera power controller 162, and may, for example, be a lithium polymer battery matrix or any other suitable battery.

A third one of the ports is used to provide the image data to an image downsizer, which is not shown in FIG. 8, but will be described in reference to FIG. 9. A fourth one of the ports is not used at this time, and may provide a spare capacity if needed.

The image data stored in the disks $150a$-$150_N$ may still contain non-zero black level of the particular imager used to take the images. A dark exposure of the imagers is taken for each imager, and the resulting non-zero black level images are stored in the magazine for later subtraction from the stored image data during post-processing in order to normalize the images exposed with the same imager within the camera. To this end, for example, the black level images may be captured after recording each image, or only one black level image may be captured per imager. Such normalizing process may be referred to as "flat fielding."

RAM-to-disk controllers $140a$, $140b$ ... $140_{N-1}$ and $140_N$ are used to control the transfer of the image data between the RAMs $120a$-$120_N$ and the disks $150a$-$150_N$. To that end, the RAM-to-disk controllers are controlled by a camera storage controller 122, which also provides control inputs to the RAMs $120a$-$120_N$ and the disks $150a$-$150_N$. The camera storage controller 122 is in turn controlled by the camera master controller.

In addition to performing functions described above, the camera master controller 160 controls a camera control panel LCD 126. The camera control panel LCD 126 may have input devices mounted/displayed thereon for a user to control the digital camera. The camera control panel LCD 126 provides feedback on control inputs, as well as the running status of the camera and magazine, including but not limited to camera exposure, frame speed, color depth, resolution, lens setting, magazine settings, battery levels, etc. In short, the camera control panel displays all aspects of the camera's operation in real-time. The master controller also controls the camera power controller 162 and a camera lens controller 164. The camera lens controller 164 controls a lens subsystem 118, which is interchangeable.

As shown in FIG. 8, camera control electronics/logic circuitry are packaged in a camera body 101. The various different controllers and other circuitry in the digital camera 100 may be implemented on one or more ASIC chips and/or microprocessors. The control electronics may be mounted on a single PCB or on two or more PCBs in accordance with whatever factors or limitations govern the design of the camera as a whole.

Figure 9:
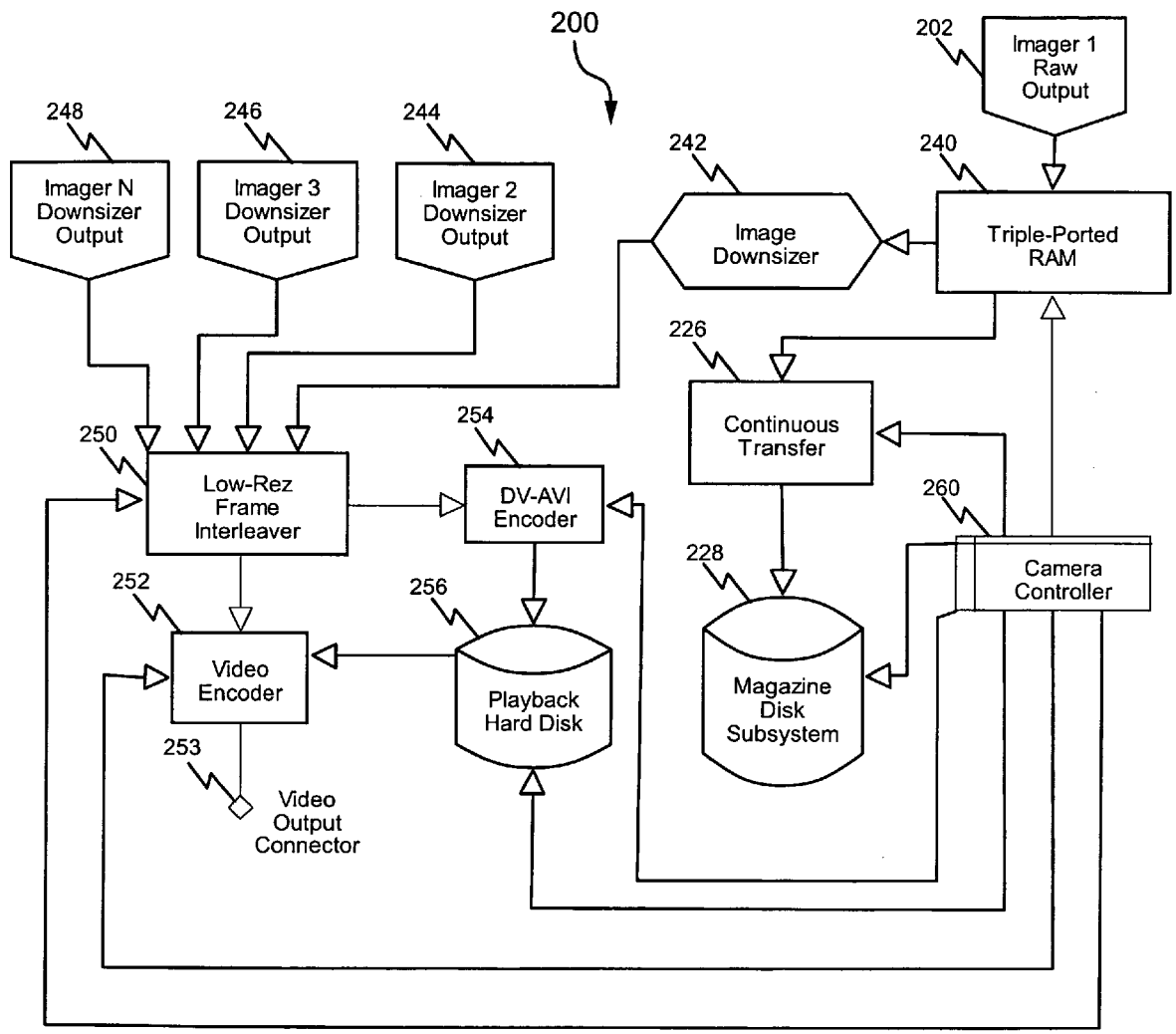
FIG. 9 illustrates storage and conversion of the images from the imagers.

The components and logic circuitry for performing functions illustrated in a functional flow diagram 200 of FIG. 9 are packaged in a camera body, such as the camera body 101 of FIG. 8. A raw output 202 is received from a first imager into a triple-ported RAM 240, which is configured as a high speed FIFO. Concurrently to receiving the input image data, the triple-ported RAM 240 continuously transfers (226) the image data to a magazine disk subsystem 228, such as the removable magazine 128 of FIG. 8. A camera controller 260, such as the camera master controller 160 of FIG. 8, controls the continuous transfer and storage processes. The triple-ported RAM 240 also provides the image data to an image downsizer 242, the output of which is provided, together with downsized outputs 244, 246 and 248 from imager 2, imager 3 ... imager N, to a frame interleaver 250 to generate a sequence of lower resolution images (i.e., a cinema) in accordance with the order in which they were captured.

The frame interleaver 250 provides the downsized and interleaved images simultaneously to a video encoder 252 and a DV-AVI encoder 254. The video encoder 252, for example, may generate video in NTSC format, and provides the video output through a video output connector 253. The video output, by way of example, is used for display on an LCD or other suitable display device connected to or integrated into the digital camera. The DV-AVI encoder 254 converts the interleaved images into video-resolution digital images in DV-AVI format, and provides the converted images to a playback hard disk 256, which is internal to the camera.

During recording ("shooting"), the video encoder 252 processes images received directly from the frame interleaver 250, to display camera imagery with minimum latency. When not shooting, images stored in the hard disk 256 can be played back through the video encoder 252. The video encoder 252 thus processes images received from two different sources: from the frame interleaver 250 during shooting, and from the playback hard disk 256 during subsequent play-back. The camera controller 260 controls the frame interleaver 250, the video encoder 252, the DV-AVI encoder 254 and the playback hard disk 256.

Figure 10:
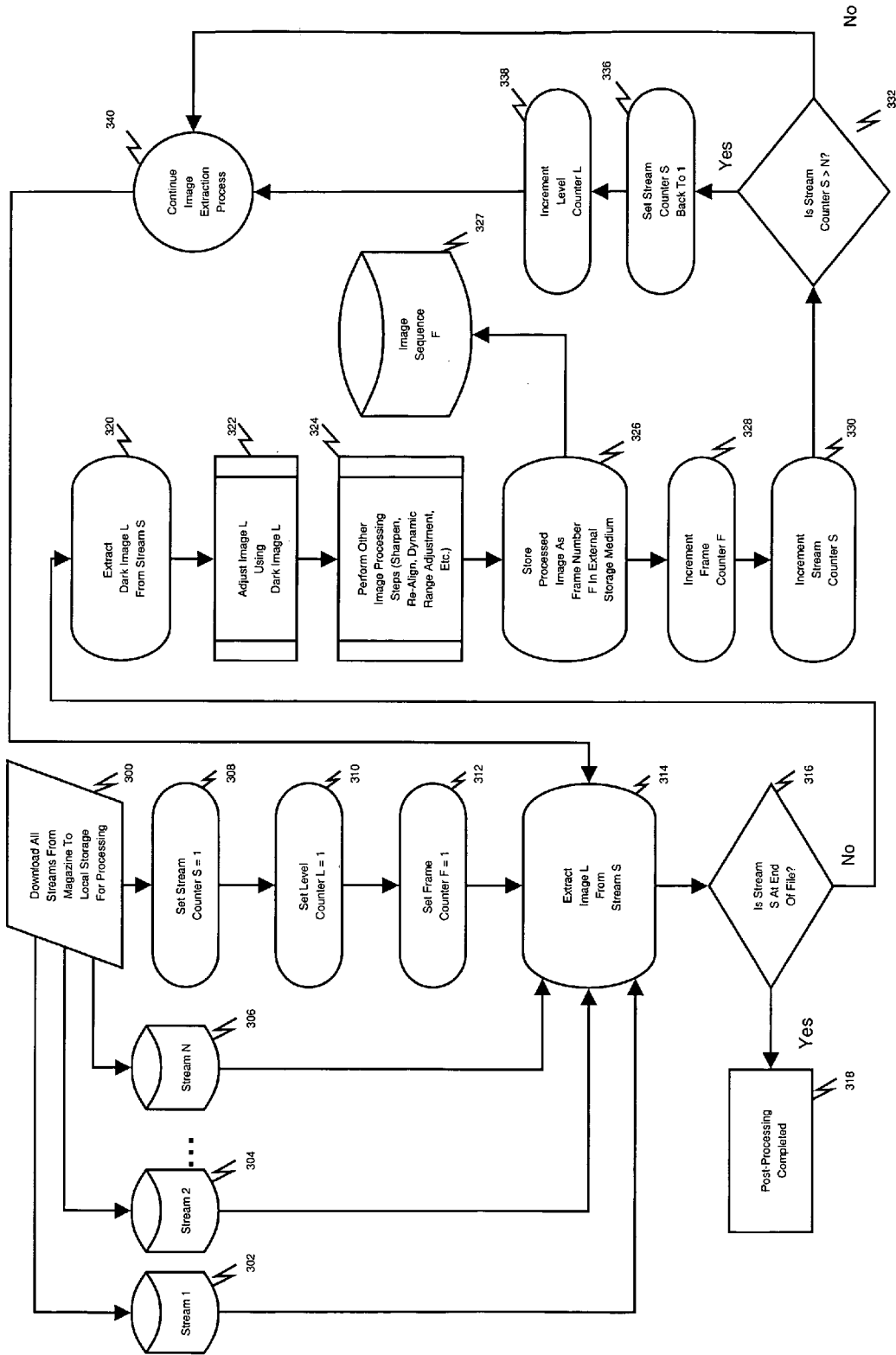
FIG. 10 is a flow diagram illustrating post-processing of the image streams in an exemplary embodiment according to the present invention.

It can be seen in FIG. 10 that all streams are downloaded from the removable magazine to local storage for processing (300). By way of example, for the case of using N imagers, each of the N streams are stored separately as stream 1 (302) and stream 2 (304) through stream N (306). The streams 1 to N may be stored in N separate hard disks or any other suitable number of hard disks. By way of example, all N streams may be stored in the same hard disk, which may have been partitioned into a number of sections according to the number of the streams.

A number of counters are set to one to keep track of the image from the N streams that is being extracted for interleaving. A stream counter S for tracking the stream from which the current image is extracted is set to one (308). A level counter L for tracking the level or depth of the frame in the particular stream from which the current image is extracted is also set to one (310). Further, a frame counter F (312), which represents the absolute frame number for the currently extracted image is set to one. Hence, S=1, L=1 and F=1 after these counters are set.

The frames are interleaved by extracting an image L from a stream S (314), and then interleaving it with other extracted images. If the stream S is at End of File (i.e., current frame is the last image of the Nth stream) (316), post-processing has been completed (318). If not, the post-processing continues.

During the post-processing, after the image L has been extracted from the stream S, a corresponding dark image L is extracted from the stream S (320). Then, the image L is adjusted using the dark image L to effect normalization or flat fielding of the image L (322). By way of example, the dark image L may be subtracted from the image L for such normalization. To the normalized image L, other image steps (e.g., sharpening, re-alignment, dynamic range adjustment, etc.) (324) are performed to process the image for a seamless integration with the other images in the sequence.

In other embodiments, there may only be one dark image per stream rather than a dark image corresponding to each image L. Since it takes time to capture a dark image corresponding to each image, such use of the single dark image per stream, which may be captured once just prior to starting to take the images, allows the higher resolution images to be taken at the same speed or same-resolution images to be taken at a higher speed.

After the image processing, the processed image is stored as a frame number F (326) in an external storage medium (327). After each image is stored in the external storage medium (327), the frame counter F is incremented by one (328) to indicate that the next image being processed/stored is to be assigned the next frame number F. Further, after each image has been processed/stored, the stream counter S is incremented by one (330) to indicate that the next image to be processed is from the next stream, but at the same level L.

If the stream counter S is greater than N (332) at this point, it indicates that all of the streams have been processed at the current level L. Therefore, the stream counter S is reset back to one (336), and the level counter L is incremented by one (338) to process the images at the next level/depth of the streams. This image extraction process continues (340) until the stream S is at End of File (316), which indicates that the post-processing has been completed (318).

By way of example, the image extraction process can proceed as follows for the case of eight streams (i.e., N=8). First all three of the counters are set as S=1, L=1 and F=1. After extracting (processing/storing) image 1 from the stream 1 as the frame 1, both the frame counter and the stream counter are incremented by one, so that S=2, L=1 and F=2. This continues until S=8, L=1 and F=8. At this time, since all the images of the level 1 have been processed in all eight of the streams, the level counter increments by one, and the stream counter is reset to one. However, the frame counter F continues to increment by one as it represents the total number of extracted images. Therefore, at this point, the counters are S=1, L=2 and F=9.

Such extraction of images continues until S=E, L=D and F=T, where D represents the last depth of the streams, E represents the last stream that has an image at the depth D, and T represents the total number of frames that have been processed/interleaved to form a sequence of images that can be displayed as a motion picture or a portion thereof.

While certain exemplary embodiments have been described above in detail and shown in the accompanying drawings, it is to be understood that such embodiments are merely illustrative of and not restrictive of the broad invention. It will thus be recognized that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention. Accordingly, the scope of the invention should be determined not by the embodiments illustrated, but by the appended claims and their equivalents.

What is claimed is:

1. A digital camera comprising:
   a plurality of imagers and a plurality of shutters mounted radially on a frame;
   a beam splitter disposed at a center of the frame, the beam splitter being rotatable to provide an input optical beam sequentially to the plurality of imagers, wherein when the input optical beam is aligned with a particular one of the imagers, a corresponding one of the shutters is triggered to apply the optical beam on the particular one of the imagers;
   a RAM for storing image streams generated by the imagers as image data; and
   a removable magazine including a hard disk drive, wherein the image data stored in the RAM are transferred to the hard disk drive,
   wherein the magazine can be replaced with a new magazine, such that the image data can remain in the removed magazine while new image data is being stored in the new magazine,
   wherein the RAM comprises a plurality of triple port RAMs having a first port, a second port and a third port, wherein the image data is stored via the first port, the stored image data is read via the second port to be transferred to the hard disk drive on a first-in, first-out basis, and the stored image data is read via the third port on a first-in, first-out basis to be converted into a format for viewing while the image streams are being generated.

2. The digital camera of claim 1, wherein the triple-port RAM comprises two dual-port RAMs in parallel.

3. The digital camera of claim 1, further comprising:
   a plurality of image downsizers for receiving the image data from the third ports of the RAMs and for lowering the resolution of the image data to generate lower resolution images;
   a frame interleaver for sequencing the lower resolution images; and
   a video encoder for converting the sequenced lower resolution images to a viewable format to generate viewable images.

4. The digital camera of claim 3, further comprising a video output connector for receiving the viewable images from the video encoder and transmitting the viewable images to an external monitor.

5. The digital camera of claim 3, further comprising:
   a display screen; and
   a hard disk drive for storing the viewable images from the video encoder and transmitting the viewable images to the display screen for viewing.

6. A method for aligning image data produced by a plurality of imagers sequentially exposed to an image provided by a rotating beam splitter, comprising:
   orienting the imagers in various degrees of rotation such that each imager generates an image stream of upright images; and
   adjusting x-axis and y-axis positions of each imager until the images produced by the imagers are aligned,
   wherein the x-axis and y-axis positions of each imager are adjusted by:
   a) exposing the plurality of imagers to a reference image;
   b) assigning one imager as a base imager;
   c) adjusting the x-axis and y-axis positions of each imager other than the base imager until its image is aligned with the image of the base imager; and
   d) if an imager cannot be adjusted to align its image with the image of the base imager, assigning that imager to be a new base imager and repeating a)-c).

* * * * *